United States Patent
Poissant

(10) Patent No.: US 8,170,903 B2
(45) Date of Patent: May 1, 2012

(54) SYSTEM AND METHOD FOR WEIGHTING CONFIGURATION ITEM RELATIONSHIPS SUPPORTING BUSINESS CRITICAL IMPACT ANALYSIS

(75) Inventor: Brian Poissant, Mukilteo, WA (US)

(73) Assignee: Computer Associates Think, Inc., Islandia, NY (US)

( * ) Notice: Subject to any disclaimer, the term of this patent is extended or adjusted under 35 U.S.C. 154(b) by 1054 days.

(21) Appl. No.: 12/100,649

(22) Filed: Apr. 10, 2008

(65) Prior Publication Data
US 2009/0259501 A1    Oct. 15, 2009

(51) Int. Cl.
*G06Q 10/00* (2006.01)
(52) U.S. Cl. ...................... 705/7.28; 705/7.36
(58) Field of Classification Search ............... 705/7.28, 705/7.36
See application file for complete search history.

(56) References Cited

U.S. PATENT DOCUMENTS

| | | | |
|---|---|---|---|
| 7,552,208 B2* | 6/2009 | Lubrecht et al. | 709/223 |
| 7,716,327 B2* | 5/2010 | Coley et al. | 709/224 |
| 2004/0215551 A1* | 10/2004 | Eder | 705/38 |
| 2005/0114186 A1* | 5/2005 | Heinrich | 705/7 |
| 2005/0114829 A1* | 5/2005 | Robin et al. | 717/101 |
| 2006/0064481 A1* | 3/2006 | Baron et al. | 709/224 |
| 2007/0100724 A1* | 5/2007 | Hollas et al. | 705/36 R |
| 2010/0070448 A1* | 3/2010 | Omoigui | 706/47 |

* cited by examiner

*Primary Examiner* — Thomas Dixon
*Assistant Examiner* — Gerald Vizvary
(74) *Attorney, Agent, or Firm* — Michael J. Buchenhorner

(57) ABSTRACT

A system and method for generating a business critical impact analysis report includes steps of: inserting a rank value field in each configuration item relationship type definition; inserting a rank value field in each single relationship between configuration items; determining default rank values for the rank value fields; assigning the default rank values to the single relationships and the relationship type definitions; receiving a user request to generate the business critical impact analysis report at a selected rank level of configuration items; and presenting the business critical impact analysis report to the user, displaying the configuration items and their relationships corresponding to the selected level.

20 Claims, 3 Drawing Sheets

SYSTEM AND METHOD FOR WEIGHTING CONFIGURATION ITEM RELATIONSHIPS SUPPORTING BUSINESS CRITICAL IMPACT ANALYSIS

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of information technology infrastructure management and more particularly relates to the field of configuration management products.

BACKGROUND OF THE INVENTION

In the field of configuration management, Configuration Items (CIs) are defined as an aggregation of hardware, software or any other tangible asset that supports or satisfies an end use function directly affiliated to the continuity of a business. The CIs are all inter-related in support of a given business. Applications run on servers, which are housed in buildings that are maintained by particular processes, and so forth. They all support a smooth running business, improved services, or improvement in the business's bottom line. The current CA-CMDB (Configuration Management Database) Product used by Computer Associates, Inc. allows users to build and manage these inter-relationships. Users leverage the relationship information today graphically through a CMDB Visualizer. The Visualizer allows the user to see what CIs are related to other CIs and provide a categorization of that relationship.

Referring now in specific detail to the drawings, and particularly FIG. 1, there is illustrated an exemplary screenshot using Visualizer.

The problem is that today's products and models provide only basic relationship information. For example, referring to FIG. 1, the Visualizer graphically highlights the following relationships:

Printer 1→Connects to→Server 1
Server 1→Hosts→Accounts Payable Application
Accounts Payable Application→requires→Printer 1
Run Doc 4→Documents→Accounts Payable Application
Run Doc 5→Documents→Printer 1

Now imagine the complexity of trying to visualize the thousands of different relationships among configuration items that are critical to a business all at once. Many current products have basic filtering mechanisms to allow you to pick the relationship types you wish to view, or limit the set of CIs based on particular attributes, but none of them allow you to apply any automated business logic to what the end user sees. The end user sees only everything or a sub-set of everything based on the attributes of the configuration items.

SUMMARY OF THE INVENTION

Briefly, according to an embodiment of the invention a method for generating a business critical impact analysis report should include steps or acts of: inserting a rank value field in each configuration item relationship type definition; inserting a rank value field in each single relationship between configuration items; determining default rank values for the rank value fields; assigning the default rank values to the single relationships and the relationship type definitions; receiving a user request to generate the business critical impact analysis report at a selected rank level of business impact; and presenting the business critical impact analysis report to the user, displaying the configuration items and their relationships corresponding to the selected level. A user may override the default rank values.

Further, a computer program product embodied on a computer readable storage medium such as a CDROM may include software program code that, when executed, enables a computer to perform the method steps as discussed above.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
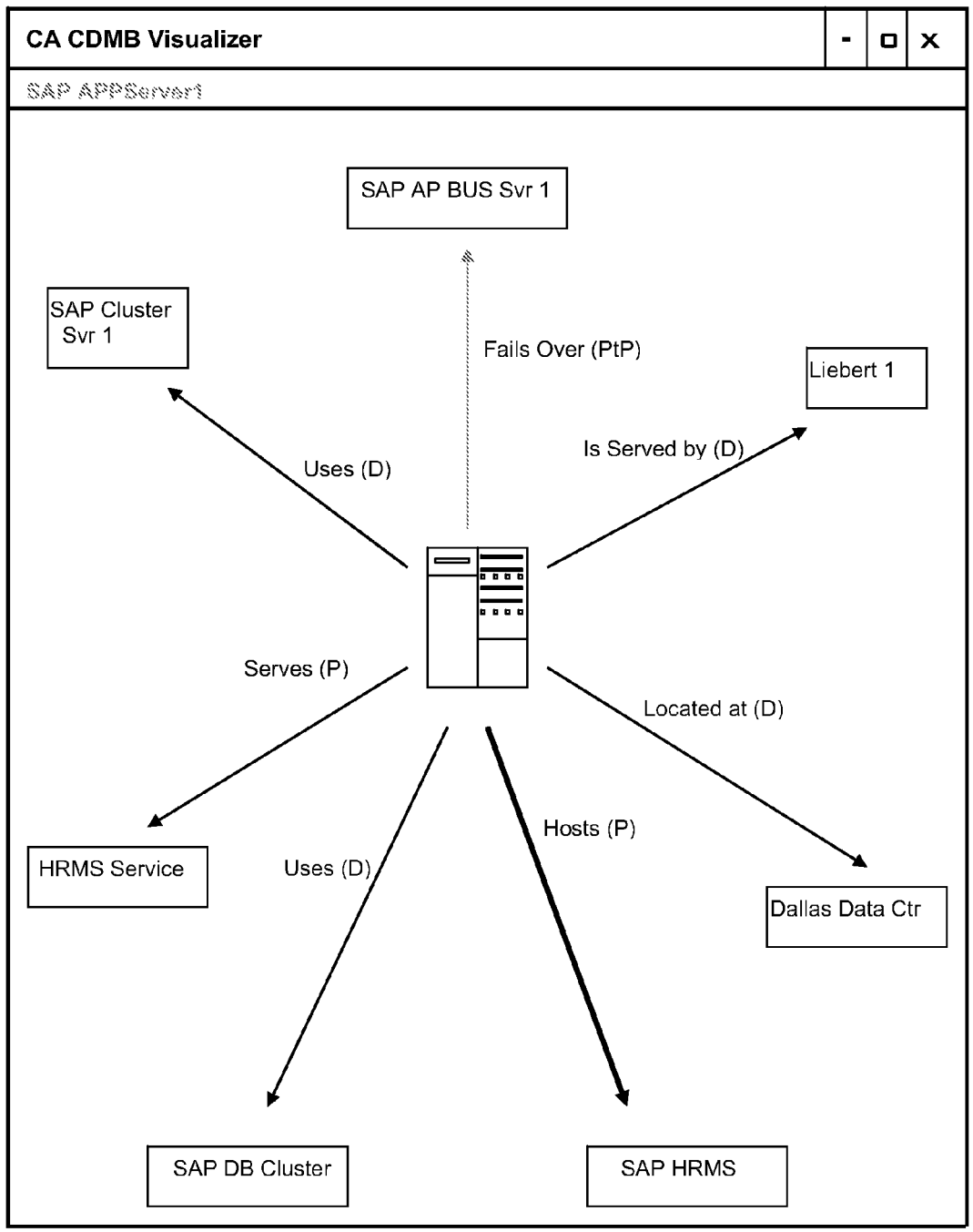
FIG. 1 is a screenshot of a Visualizer screen, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a system and method that enables a user to see the criticality of the inter-relationships among configuration items based on their business impact. This improves upon known methods which simply show relationships based on a set list of attributes. The method according to an embodiment of the present invention introduces a ranking system and a new algorithm that employs default metrics. The invention adds the following functionality:

a default rank field on the relationship type definition;
a default rank field on the single relationship itself; and
a new algorithm that is used to properly support impact analysis at the business level as opposed to the operations level. By assigning a ranking value to each relationship, and another value of that relationship ranking by a role, it is possible to display the relationship in context of the user's role and in context of its relationship to the business. For example, a Procurement Officer might want to view the CIs and their relationships in an environment based on department ownership, and thus those relationship types would be ranked higher for that role. However, a Business Analyst would want to perhaps view the relationships that are more aligned to the infrastructure (CIs hosted, backed-up by, and so forth) as more important to what their role has to deliver to the business.

The new functionality provides for more accurate impact analysis practices for the evaluation of proposed changes to the infrastructure. In addition, it provides a method for the business user to set the importance of relationships based on default rankings, and override these defaults based on the deliverables for their particular role in the organization, so that they can model their infrastructure to their business needs with greater accuracy.

Additionally, by leveraging this solution a business is now able to deem certain relationship types to be more critical than others, based on the business value of the relationship between the two CIs, instead of the attributes of the two CIs.

By adding a rank value to the individual relationship definitions and leveraging the algorithms below, a business can filter out less critical relationships in a report or in the Visualizer, and still see those individual relationships whose default would normally be outside of the scope of the filter, but would override the default value with the value in the rank field on the relationship itself.

In the example above, the relationship type "Documents" had a default ranking of 7, "Connects To" had a default ranking of 5, that "Requires" had a default ranking of 2, and that "Hosts" had a default ranking of 1. For purposes of this discussion, "1" is the highest ranking, "10" is the lowest ranking.

Additionally, the individual relationship of Run Doc5→Documents→Printer1 had its own ranking of 1, indicating that this particular relationship is VERY important to the business. Remember that if this individual ranking did not exist, it would default to 7.

When a user runs an impact analysis using current methods, the user is presented with all relationships; in some cases hundreds per page. The user then has to filter out all of the "noisy" relationships to get to the appropriate level of business critical information.

With this new feature in place, users can use a slider bar at the top of the user interface that would quickly blur out any of the CIs and relationships based on their ranking, complete with exceptions to the default rankings, and in addition to any filtering that the user has already done—but without having to worry about losing critical relationships due to over-filtering.

If the user were to perform a Level 5 Business Impact Analysis of the infrastructure, all of the relationships ranked as 5 and above would appear in the user interface, except for the RunDoc 4→Documents→Accounts Payable Application, since the default ranking for "Documents" is 7.

The single relationship of RunDoc5→Documents→Printer would appear since its individual ranking overrode the default ranking of "Documents" (Remember it had a ranking of 1). There is no other product on the market that has the ability to customize its impact analysis process. They all simply look to traverse a tree hierarchy and determine what components are in each of the branches. This methodology is far more accurate, and can be easily modified to meet each individual customer need.

Figure 2:
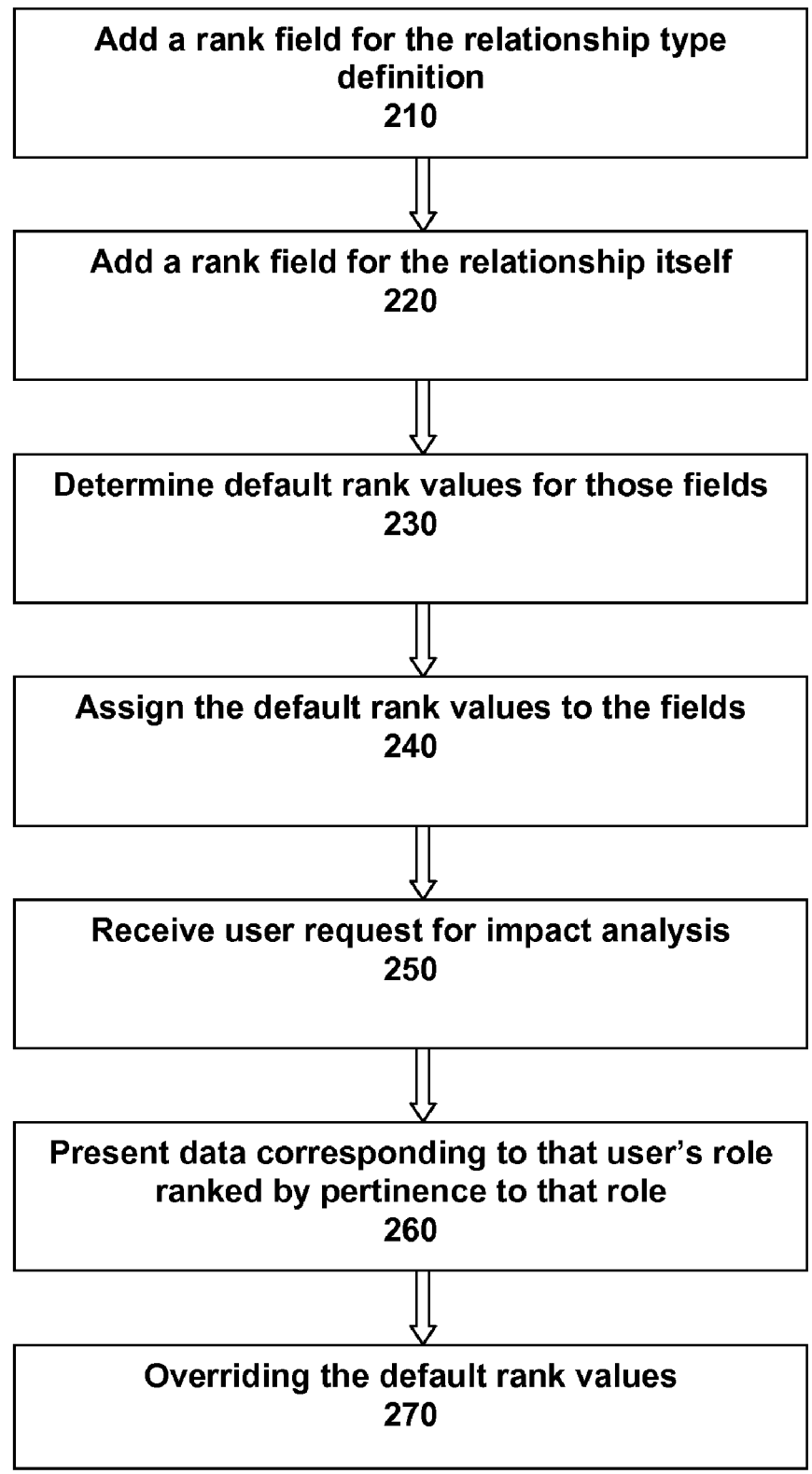
FIG. 2 is a flow chart of a method according to an embodiment of the present invention.

Referring to FIG. 2, a flow chart 200 of a method for supporting business critical impact analysis is shown. First, in step 210 we add a new rank field to the existing relationship type definition. Then in step 220 we add a new rank field for the relationship itself.

In step 230 we determine the default rank values that are to be assigned to each rank field that was added in steps 210 and 220. These default rank values are determined based on different factors. They may be based on proprietary best practices for the business. Different roles within an organization will have different ideas on what constitutes importance usually based on the deliverables for their role. For this reason the entire ranking system can be built differently for each role. For example, an operations analyst may place a higher ranking value on those relationship types that are centered around describing "physical" relationships among configuration items. (i.e. connects to, updates, backs-up would all have higher rankings for this role) An Asset Manager role would likely assign higher rankings to relationship types that describe ownership or financial responsibility (i.e. Is location for, Is used by, Is business owner of).

Regardless of what the default values are for a product the key here is that the entire ranking system is completely configurable by role, and thus provides a level of accuracy and detail driven by the specific deliverables of the role to the business as a whole, as opposed to a "one size fits all" perspective on rankings.

In step 240 we assign the default rank values to the fields. Once assigned, keep in mind that the values can be overridden. In step 250 we receive a user's request for an impact analysis report. The user supplies a level of business impact that he/she wishes to view. Assume that the user has requested a business impact analysis report at level 5. In step 260, in response to the user's request, we present the impact analysis report, showing only the fields corresponding to the requested level, and above. Therefore, the report will show the configuration items and their relationships that have been assigned the rank value between 1 and 5. In an alternate embodiment, all fields can be presented, with the non-requested fields grayed, blurred out, or otherwise de-emphasized. The default rankings already in place are used to prepare the report.

In step 270, the default rank values can be easily overridden with values selected by a user, for any number of reasons. As an example, the Asset Manager may override the default values with values that indicate greater importance for the business relationships having to do with ownership and maintenance. Then, the Asset Manager may request a business critical impact analysis report. Assume that the Asset Manager also requests a "Level 5" report. Because the default values have been overridden to reflect the Asset Manager's view of the importance of the relationships, this new report may show entirely different configuration item relationships from the previously produced "Level 5" report.

Figure 3:
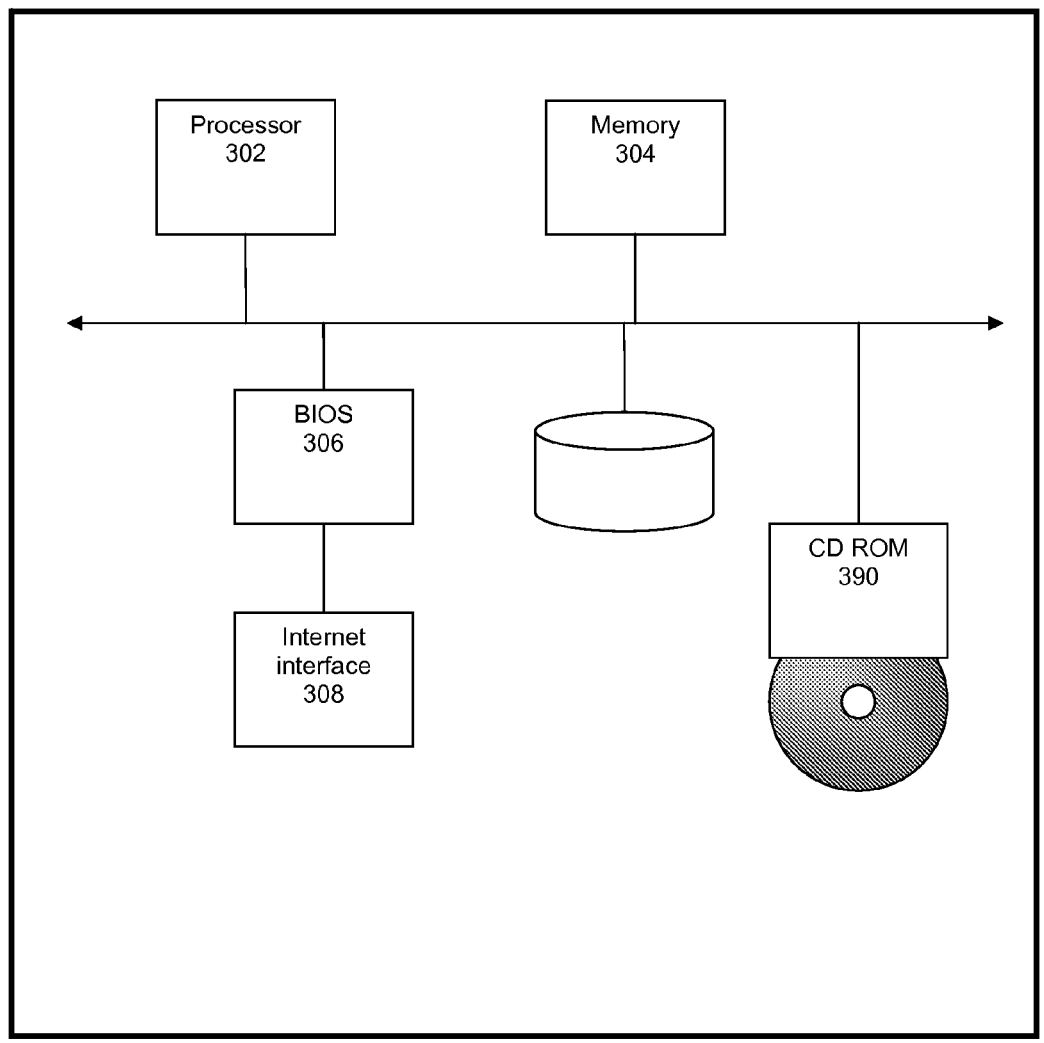
FIG. 3 is a high level block diagram showing an information processing system according to another embodiment of the invention.

Referring to FIG. 3 there is shown a block diagram of an information handling system 300 consistent with an embodiment of the present invention. For purposes of this invention, computer system 300 may represent any type of computer, information processing system or other programmable electronic device, including a client computer, a server computer, a portable computer, an embedded controller, a personal digital assistant, and so on. The computer system 300 may be a stand-alone device or networked into a larger system.

The system 300 could include a number of operators and peripheral devices as shown, including a processor 302, a memory 304, and an input/output (I/O) subsystem 306. The input/output subsystem 306 will likely include a graphical user interface for facilitating the display and selection of rankings and also for displaying the business impact report. The report may be displayed on a computer monitor screen, as an electronic document, web page, or as a paper document. The configuration items may be shown as icons on the display. Known methods for manipulating screen data such as pull-down or drop-down menus, check boxes, and slider bars may be used.

The processor 302 may be a general or special purpose microprocessor operating under control of computer program instructions executed from a memory. The processor may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory that perform their respective functions when executed. Alternatively, some or all of the sub-processors may be implemented in an ASIC. RAM may be embodied in one or more memory chips. The memory may be partitioned or otherwise mapped to reflect the boundaries of the various memory subcomponents.

The memory 304 represents either a random-access memory or mass storage. It can be volatile or non-volatile. The system 300 can also comprise a magnetic media mass storage device such as a hard disk drive.

The I/O subsystem 306 may comprise various end user interfaces such as a display, a keyboard, and a mouse. The I/O subsystem 306 may further comprise a connection to a network such as a local-area network (LAN) or wide-area network (WAN) such as the Internet 308. Processor and memory components are physically interconnected using conventional bus architecture.

What has been shown and discussed is a highly-simplified depiction of a programmable computer apparatus. Those skilled in the art will appreciate that a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include ROMs, DVD-ROMs, and transmission-type media, such as digital and analog communication links, wired or wireless communications links using transmission forms, such as, for example, radio frequency and light wave transmissions. The signal bearing media make take the form of coded formats that are decoded for use in a particular data processing system.

According to another embodiment of the invention, a computer readable medium, such as a CDROM 390 can include program instructions for operating the programmable computer 300 according to the invention. Alternatively, the program instructions may be downloaded onto the programmable computer 300. What has been shown and discussed is a highly-simplified depiction of a programmable computer apparatus. Those skilled in the art will appreciate that other low-level components and connections are required in any practical application of a computer apparatus.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

I claim:

1. A computer-implemented method for generating a business critical impact analysis report, the method comprising steps of:
    using an information processing device to perform:
        displaying to a user a criticality of relationships among configuration items based on their business impact;
        assigning a ranking value to each relationship, and another value of that relationship ranking by a role;
        displaying on a display device the relationship in context of a user's role and in context of its relationship to a business;
        adding the ranking value to the individual relationship definitions;
        inserting a rank value field in an existing relationship type definition of each of a plurality of configuration items;
        inserting a rank value field in each single relationship between each of the plurality of configuration items;
        determining default rank values for the rank value fields based on a business value of the relationships between the configuration items;
        assigning the default rank values to the rank value fields in each of the single relationships and the relationship type definitions;
        receiving a user request to generate the business critical impact analysis report at a selected rank level of business impact; and
        presenting on the display device the business critical impact analysis report to the user, such that the configuration items and their associated relationships corresponding to the selected level are displayed.

2. The method of claim 1 wherein presenting the business critical impact analysis report further comprises displaying the configuration items and relationships corresponding to levels above the selected level.

3. The method of claim 1 further comprising overriding the default rank values with user-defined default rank values.

4. The method of claim 3 further comprising overriding the default rank values with the user-defined default rank values that are based on deliverables for their particular role in an organization.

5. The method of claim 3 further comprising overriding the default rank values with the user-defined default rank values that are based on the user's role and said role's relationship to an organization.

6. The method of claim 1 wherein presenting the business critical impact analysis report further comprises displaying the configuration items and relationships of all levels, not just the selected level.

7. The method of claim 6 further comprising differentiating the configuration items associated with relationships of the selected level from the configuration items associated with relationships pertaining to other levels.

8. The method of claim 7 wherein differentiating the configuration items of the selected level comprises graying out the configuration items pertaining to the other levels.

9. The method of claim 7 wherein differentiating the configuration items of the selected level comprises highlighting said configuration items.

10. An information processing system for generating a business critical impact analysis report, the system comprising:

a processor for:
displaying to a user by a graphical user interface a criticality of relationships among configuration items based on their business impact;
assigning a ranking value to each relationship, and another value of that relationship ranking by a role;
displaying on a display device the relationship in context of a user's role and in context of its relationship to a business;
adding the ranking value to the individual relationship definitions;
inserting a rank value field in an existing relationship type definition of each of a plurality of configuration items;
inserting a rank value field in each single relationship between each of the plurality of configuration items;
determining default rank values for the rank value fields based on a business value of the relationships between the configuration items;
assigning the default rank values to the rank value fields in each of the single relationships and the relationship type definitions;
a data storage;
a memory operatively coupled with the processor; and
an input/output interface configured for:
receiving a user request to generate the business critical impact analysis report at a selected rank level of business impact; and
presenting the business critical impact analysis report to the user, such that the configuration items and their associated relationships corresponding to the selected level are displayed.

11. The information processing system of claim 10 further comprising a web interface for displaying the business critical impact analysis report as a web page.

12. The information processing system of claim 10 wherein the input/output interface comprises a computer screen for presenting a display of the business critical impact analysis report.

13. The information processing system of claim 12 wherein the display comprises a graphical user interface that allows a user to select and modify the configuration items and relationships that are displayed, through the display.

14. The information processing system of claim 13 wherein the graphical user interface comprises a slider bar for selecting and modifying the configuration item relationships.

15. The information processing system of claim 13 wherein the graphical user interface comprises a drop-down menu for selecting and modifying the configuration item relationships.

16. The information processing system of claim 13 wherein the configuration items are represented as icons.

17. The information processing system of claim 10 wherein the configuration items comprise: hardware, software, inventory, supplies, and property.

18. The information processing system of claim 17 wherein the relationships between the configuration items comprise: connects to, requires, hosts, documents, is owned by, owns, is backed up by, requires, located at, uses, is served by, and serves.

19. A computer program product embodied on a non-transitory computer readable storage medium and comprising code that, when executed, enables a computer to:
use an information processing device to:
display to a user a criticality of inter-relationships among configuration items based on their business impact;
assign a ranking value to each inter-relationship, and another value of that relationship ranking by a role;
display on a display device the relationship in context of a user's role and in context of its relationship to the business;
add the ranking value to the individual relationship definitions;
insert a rank value field in an existing relationship type definition of each of a plurality of configuration items;
insert a rank value field in each single relationship between each of the plurality of configuration items;
determine default rank values for the rank value fields based on a business value of the relationships between the configuration items;
assign the default rank values to the rank value fields in each of the single relationships and the relationship type definitions;
receive a user request to generate the business critical impact analysis report at a selected rank level of business impact; and
present the business critical impact analysis report to the user, such that the configuration items and their relationships corresponding to the selected level are displayed.

20. The computer program product of claim 19 wherein the code further enables the computer to override the default rank values with user-defined default rank values.

* * * * *